United States Patent
Hockney et al.

(10) Patent No.: US 6,262,505 B1
(45) Date of Patent: *Jul. 17, 2001

(54) FLYWHEEL POWER SUPPLY HAVING AXIAL MAGNETIC BEARING FOR FRICTIONLESS ROTATION

(75) Inventors: Richard L. Hockney, Lynnfield; Stephen B. Nichols, Charlestown; Geoffrey B. Lansberry, Cambridge; Francis E. Nimblett, Beverly; Dariusz A. Bushko, Hopkinton; Gita P. Rao, Belmont; Luka Serdar, Lexington; Michael E. Amaral, Norwood; William E. Stanton, Waltham; James O'Rourke, Woburn, all of MA (US)

(73) Assignee: SatCon Technology Corporation, Cambridge, MA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/824,862

(22) Filed: Mar. 26, 1997

(51) Int. Cl.⁷ .................... H02K 7/09; H02K 5/24
(52) U.S. Cl. .................. 310/90.5; 74/574; 310/51
(58) Field of Search ............... 310/74, 90.5, 51; 74/572, 574, 5.46; 244/165, 166

(56) References Cited

U.S. PATENT DOCUMENTS

| | | | |
|---|---|---|---|
| 3,323,763 | * 6/1967 | Butts | 310/51 |
| 3,860,300 | * 1/1975 | Lyman | 310/90.5 |
| 3,874,778 | 4/1975 | Kato et al. | 350/7 |
| 3,955,858 | 5/1976 | Poubeau | 308/10 |
| 4,285,251 | * 8/1981 | Swartout | 74/572 |
| 4,444,444 | * 4/1984 | Benedetti et al. | 310/90.5 |
| 4,541,772 | 9/1985 | Becker | 415/90 |
| 4,860,611 | * 8/1989 | Flanagan et al. | 74/574 |
| 5,126,610 | * 6/1992 | Fremerey | 310/90.5 |
| 5,212,419 | * 5/1993 | Fisher et al. | 310/254 |
| 5,436,512 | * 7/1995 | Inam et al. | 307/58 |
| 5,521,448 | * 5/1996 | Tecza et al. | 310/90.5 |
| 5,548,170 | * 8/1996 | Shultz | 310/90.5 |
| 5,559,381 | * 9/1996 | Bosley et al. | 310/34 |
| 5,628,232 | 5/1997 | Bakholdin et al. | 74/572 |
| 5,682,071 | * 10/1997 | Buhler et al. | 310/90.5 |
| 5,708,312 | 1/1998 | Rosen et al. | 310/90 |
| 5,749,700 | * 5/1998 | Henry et al. | 415/104 |

FOREIGN PATENT DOCUMENTS

| | | | |
|---|---|---|---|
| 58-65321 | * 4/1983 | (JP) | 310/90.5 |
| 8-275444 | * 10/1996 | (JP) | 310/74 |

OTHER PUBLICATIONS

"Design of Brushless Permanent–Magnet Motors"; Hendershot and Miller; pp. 2–2, 2–4, 4–5, 6–41, 1994.*

* cited by examiner

*Primary Examiner*—Karl Tamai
(74) *Attorney, Agent, or Firm*—Dike, Bronstein, Roberts & Cushman, Intellectual Property Practice Group; George W. Meuner

(57) ABSTRACT

A power supply device for providing uninterrupted power for a period of time is disclosed. The power supply device has a controller and a flywheel device. The flywheel device has a housing that contains a flywheel rotor and a motor/generator rotor. The flywheel rotor and the motor/generator rotor are mounted on a common shaft. An active axial magnetic bearing is located to support the shaft for frictionless rotation. The bearing provides support for the shaft, the flywheel rotor and motor/generator rotor. The axial magnetic bearing is attached to the housing and provides, in combination with the motor/generator rotor, a flux path and magnetic field to exert a magnetic force to lift the motor/generator rotor and the shaft on which it is mounted.

40 Claims, 10 Drawing Sheets

FLYWHEEL POWER SUPPLY HAVING AXIAL MAGNETIC BEARING FOR FRICTIONLESS ROTATION

FIELD OF THE INVENTION

This invention relates to uninterruptible power supply systems and particularly to flywheel systems. More particularly, the invention relates to a magnetic levitation flywheel system.

BACKGROUND OF THE INVENTION

The telephone industry has long used lead acid batteries for back-up power to provide uninterruptible service. The typical telephone network sends signals over optical fiber from the central office to a remote terminal. There, the signals are converted from optical into electrical waves and demultiplexed onto individual copper lines bundled together as trunks for connecting to the home.

Each remote terminal supports approximately 1000 homes. The cable companies use a similar configuration, where signals are sent from the "head end" (cable company office) to remote terminals servicing approximately 500 homes. At the terminals, the signal is converted from optical to electrical waves for transmission over coaxial cable to individual subscribers. In both cases the remote terminal uses power provided by the local utility to carry the signal from the terminal to the subscriber, since fiber optic cable cannot carry electricity. To support the terminal during a utility outage, the phone or cable companies install a back-up power supply, typically an uninterruptible power supply which uses batteries as a power source.

It is desirable to eliminate batteries from these networks because of their limited life, poor reliability, and high maintenance requirements. These unfavorable attributes translate to high operating cost. Although commonly used valve-regulated lead acid batteries are referred to as "maintenance free," the batteries need continuous on-site monitoring and maintenance. The performance and life of batteries is temperature dependent. Heat degradation occurs above 77° F. (for every 15° F. increase above 77° F. the battery life is reduced by 50%). As a result, a battery schedule for 'change out' in five years only lasts two to three years. Batteries are also susceptible to "thermal runaway," which can result in the release of explosive hydrogen gas. In addition, batteries are not environmentally friendly due to lead content and are coming under increasingly strict environmental and safety regulations.

One replacement for batteries is the flywheel energy storage system. Existing systems for supporting high speed flywheels utilize either mechanical contact bearings or expensive and complicated magnetic bearing systems. Mechanical rolling element bearings have very limited life due to the high rotational speeds necessary for an effective flywheel energy storage system. Further disadvantages of mechanical bearings are noise, vibration, and poor reliability in the vacuum environment required to reduce windage losses of the high speed flywheel. A non contacting support with all control apparatus outside the vacuum solves these problems. Existing magnetic levitation systems typically are either expensive due to multiple axes of active control, or suffer from complicated magnetic structures when combining active and passive control.

U.S. Pat. No. 4,211,452 describes an inertia wheel more particularly adapted to space applications. It includes the combination of a peripheral type of motor with permanent magnet on the rotor and ironless winding on the stator. This structure limits speed due to stress. The current of the winding is switched electronically by an amplitude modulation system, associated to a reactance coefficient varying circuit, and reversal of direction of rotation of which is achieved by permutation of the control circuits. There are also provided bearings formed by a passive radial magnetic centering device and a redundant active axial magnetic centering device slaved to an axial rate detector. This device requires a permanent magnet and four control coils just for axial control.

U.S. Pat. No. 4,620,752 describes a magnetic bearing having position stabilization of a supported body which includes damping and aligning arrangement. An application of the magnetic bearing is illustrated showing a magnetic bearing system for a flywheel. This system requires combining two control coils with two rotating permanent magnets for each bearing.

It can be appreciated that new and improved magnetic levitation flywheel systems are desired, in particular, for backup power supply systems to provide uninterruptible power supplies.

SUMMARY OF THE INVENTION

In accord with the present invention an uninterruptible power supply system is provided having a magnetic levitation flywheel module. The flywheel module comprises a flywheel rotor contained in a vacuum housing. The flywheel rotor is attached to a hub that is suspended from the housing by a frictionless axial magnetic bearing. Also, suspended by the magnetic bearing is the rotor of a permanent magnet motor/generator.

In accord with the present invention, a backup power supply comprises a controller and a flywheel module. The controller is configured to provide initial charge up of the flywheel to bring it up to standby speed, to keep the flywheel, speed within a predetermined range at standby, to provide a predetermined voltage to the system for uninterrupted power supply, and to monitor the status of the flywheel module.

The flywheel module comprises a vacuum housing. In the housing is a flywheel and a motor/generator. The flywheel rotor and the motor/generator rotor are mounted on a common shaft and an active axial magnetic bearing being located to support the shaft for frictionless rotation. The bearing provides support, or axial lift, for the shaft, the flywheel and the motor/generator. The axial magnetic bearing is attached to the housing and provides, in combination with the motor/generator rotor, a flux path and magnetic field that provides a magnetic force to lift the motor/generator rotor and the shaft on which it is mounted.

More particularly, the flywheel module comprises a vertical shaft on which the flywheel rotor is mounted along with the motor/generator rotor. Radially polarized permanent magnets are mounted around the motor rotor to provide at least four poles. A motor stator is fixedly mounted in relation to the rotor. Preferably, a passive radial magnetic bearing is located at one end of the shaft, more preferably at both ends. The passive radial bearing or bearings produce axial lift as well as radial centering. The axial lift offloads the active axial bearing and preferably lifts about 70% or more of the weight of the rotors. Typically, the passive bearings lift no more than 90% of the rotor weight. In one embodiment, the passive bearings lift 80% of the rotor weight.

In another embodiment, a damping device is positioned at one or, preferably, both ends of the shaft. One damping device comprises a plate member having a center bore and a sleeve positioned in the center bore and fitting around the shaft. The plate member has a chamber for containing a damping fluid. The chamber communicates with the center bore by means of a bore hole for fluid passage therebetween. The chamber also contains a spring and a plug, the plug being located between the spring and the fluid to transfer a force from the spring to the fluid or the fluid to the spring. As an alternative, an elastomeric ring can be used as a damping device.

The permanent magnetic motor/generator draws power from an electrical bus to spin-up the flywheel rotor to its steady state speed, transforming electrical energy into kinetic energy. The flywheel remains at its steady state rotational speed, drawing a nominal load from the bus. When power is required by the power supply system, the motor/generator transitions from a motor to a generator drawing energy from the flywheel for delivery to the bus.

The flywheel energy storage system (FESS) of the present invention can provide a "plug for plug" replacement for batteries in telecommunications remote powering applications such as vaults, huts and cabinets.

DETAILED DESCRIPTION OF THE INVENTION INCLUDING PREFERRED EMBODIMENTS

Figure 1:
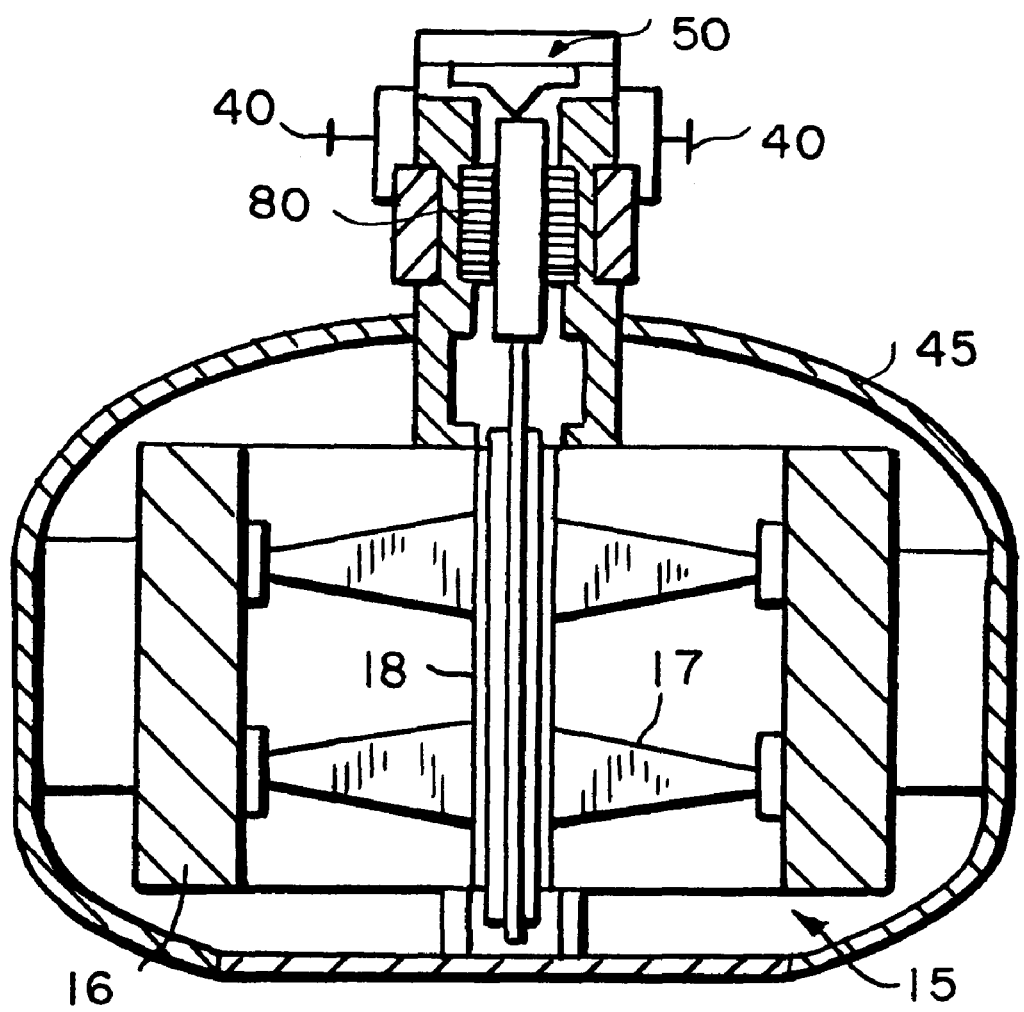
FIG. 1 is an elevational view, partly in cross-section, of a flywheel module in accord with one embodiment of the present invention.

A preferred flywheel device in accord with the present invention will be described with reference to the drawings. As illustrated in FIG. 1, a preferred flywheel device is configured as a module. A housing 45 contains the flywheel 15 which is suspended in the housing. The flywheel 15 is made with a flywheel rotor rim 16 which is an energy storage rim. The flywheel rotor rim 16 is mounted on a hub 17 which rotates at one and of an shaft 18. The module can be suspended from pins 40 to provide one axis of a two axis gimbal suspension.

A permanent magnet motor/generator 80 is located near one end of the shaft and an axial magnetic bearing 50 is located adjacent the motor/generator. The housing 45 surrounds the flywheel and preferably contains a vacuum with the vacuum level maintained by an ion pump (not shown).

Figure 3:
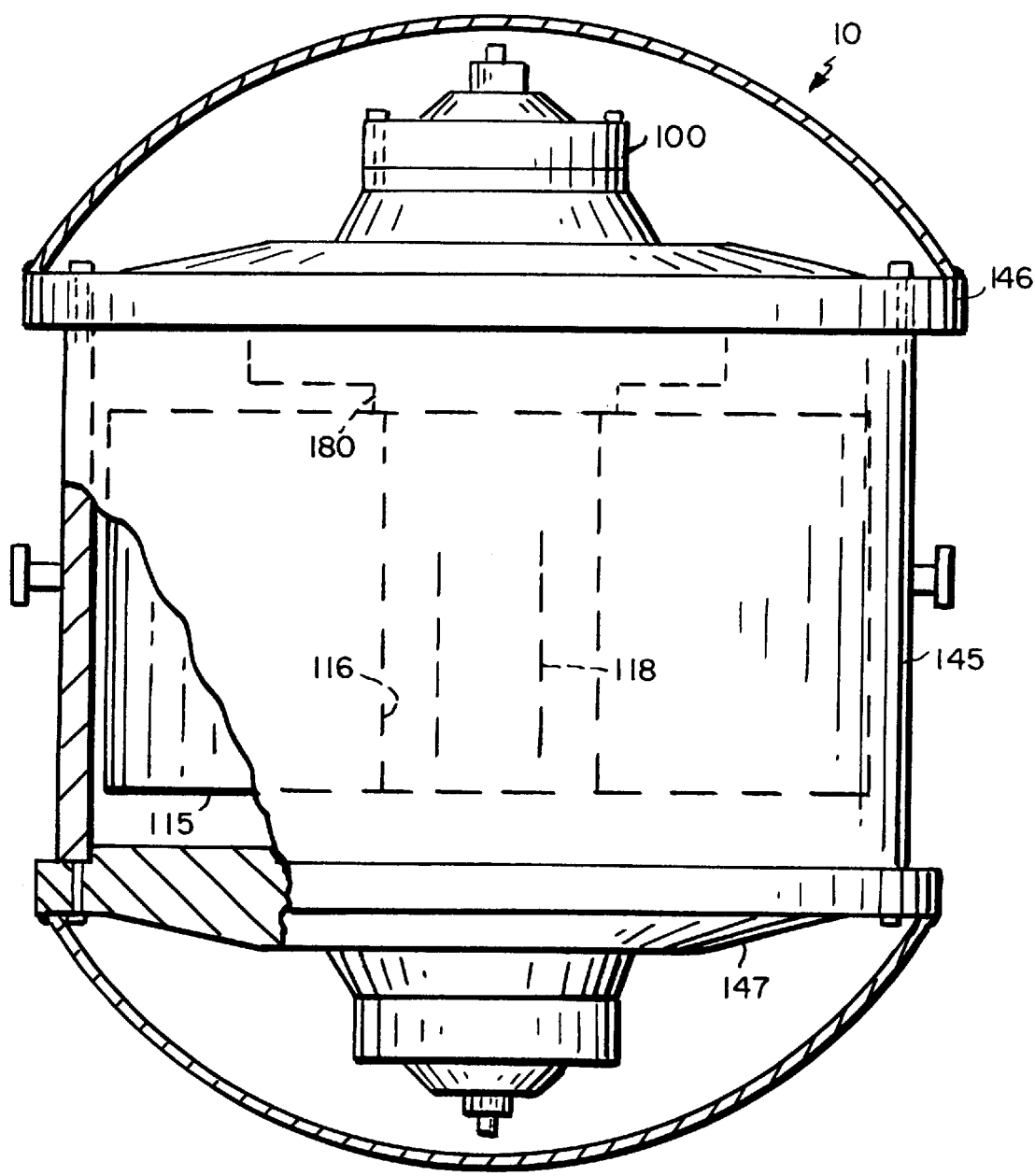
FIG. 3 is an elevational view of a flywheel module in accord with a preferred embodiment of the present invention.

In a preferred embodiment, a flywheel module 10 is constructed as illustrated in FIG. 3. A vacuum housing comprising housing cylinder 145, top cover 146 and bottom cover 147 surrounds the flywheel rotor 115. The flywheel rotor is mounted on a cylindrical support tube 116, which in turn is mounted on the vertical shaft 118. At the top of the cylindrical support tube 116 is positioned the motor/generator 180, a portion of which is conveniently used to mount the cylindrical support tube at its top end on the shaft.

Figure 4:
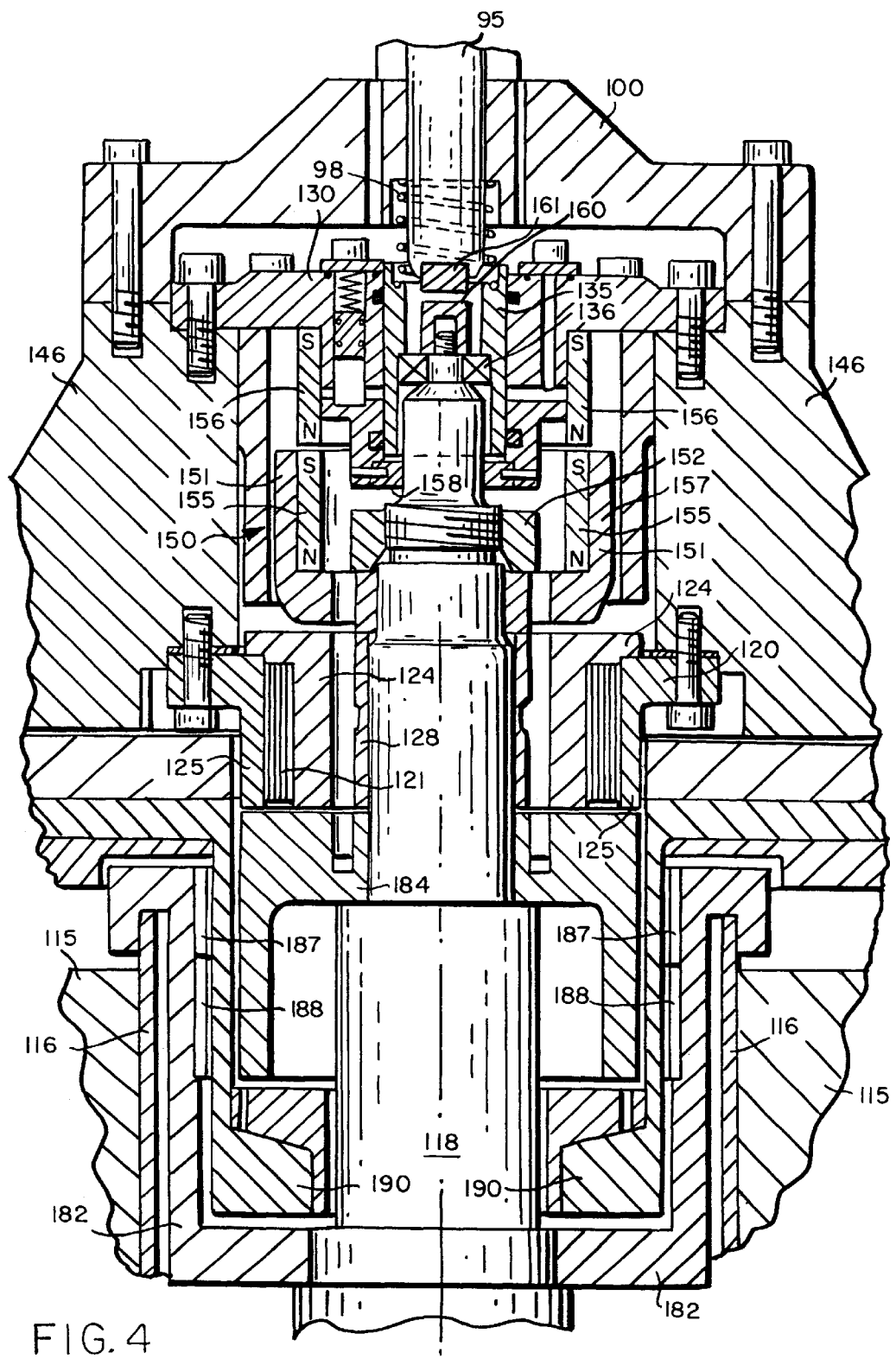
FIG. 4 is a partial cross sectional view illustrating further detail of the motor/generator assembly, top end radial magnetic bearing and damping system of the flywheel module illustrated in FIG. 3.

The motor/generator assembly 180 is illustrated in further detail in FIG. 4. The motor/generator rotor is provided in two parts; an outer rotor cup 182 and an inner rotor cup 184, both of which are preferably made of iron and mounted on shaft 118 and which act as the return flux path for radially polarized permanent magnet pole pieces 187, 188. The stator 190 is configured with a L-shaped cross section and is fixedly mounted to the top cover 146. The outer rotor cup 182 is configured at its top end to receive and hold the cylindrical support tube 116.

On top of and adjacent to the inner rotor cup 184 is fixedly mounted an active magnetic bearing 120 having a coil 121 wound around an inner ferromagnetic core member 124 and sandwiched between the inner core member and an outer ferromagnetic flux member 125. The inner rotor cup 184 is made also of a ferromagnetic material. Thus, when a current is applied to the coil 121, a magnetic flux path is established through the inner ferromagnetic core member 124, the outer ferromagnetic flux member 125 and the ferromagnetic inner rotor cup 184 and an axial magnetic force is exerted on the shaft 118 through the inner rotor cup.

Radially polarized permanent magnets 187,188 are mounted to the outer rotor cup as alternately polarized pole pieces. As an alternative, a single row of radially polarized magnets can be used.

Figure 5:
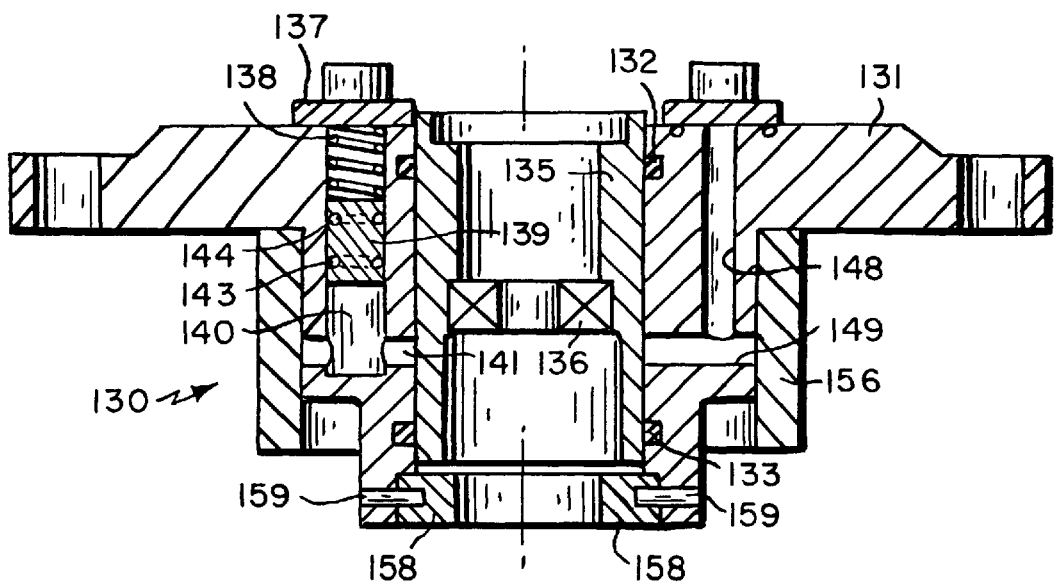
FIG. 5 is a cross sectional view illustrating further detail of the top end damping system for the flywheel module illustrated in FIG. 3.

At the top end of the shaft 118 is a touchdown bearing comprising magnetic bearing assembly 150 and an annulus 158 providing a radial touchdown bearing, and a hardened surface 160 at the end of the shaft with a touchdown button 161 located in the top cover 146 assembly (see FIG. 4). Preferably, the annulus 158 and button 161 are made of a polyimide material, or the like. Also, in the top cover assembly is a damping system 130 (see FIGS. 4,5). An end plate 100 is mounted on top of the top cover 146. The end plate holds a fixed center rod 95 at the end of which is mounted touchdown button 161. A spring 98 is positioned within the end plate to provide an axial preload force. The spring engages sleeve 135 in which the end of shaft 118 rotates in ball bearing 136.

The magnetic bearing assembly 150 is a passive combination axial/radial magnetic bearing. A portion mounted to the shaft 118 comprises a cup member 151, preferably made of titanium, which is spaced axially from the inner rotor cup 184 by a spacer member 128. The cup member 151 is held in place by a retainer nut 152 threaded on the end of the shaft 118. Inside the cup wall is fixed an axially polarized permanent magnet 155, which is held by suitable means such as epoxy. A second axially polarized permanent magnet 156 is fixedly mounted above the magnet 155. Both are polarized so the magnets attract, providing passive axial support for a portion of the weight of the rotor, preferably at least about 70%. The magnets in axial attraction also provide radial stabilization for the shaft 118. The permanent magnets 155,156 can be multiple annular rings of permanent magnet material.

The damping system 130 (see FIG. 5), preferably comprises a plate member 131 that attaches to top cover 146. A cylindrical sleeve 135 is positioned within a center bore in the plate member 131. An annulus 158 providing a radial touchdown bearing is held in the plate member 131 by pins 159. O-rings 132,133 provide a seal for the annular space between the cylindrical sleeve 135 and the bore wall. A ball bearing 136 is mounted within the sleeve to receive the top end of shaft 118. A chamber 140 is located in the plate member 131 in proximity to the central bore. A bore hole 141 communicates between the chamber 140 and the annular space between the cylindrical sleeve 135 and the bore wall. The chamber and annular space are filled with a damping fluid to damp radial vibration at the end of the shaft 118. In the chamber 140 is a plug 139 which exerts pressure on the damping fluid due to spring 138. The spring is held in place by damper cover 137. The plug 139 has o-rings 143,144 to provide a seal with the chamber wall. To provide damping fluid uniformly around sleeve 135, one or more additional bores 148 are used as fluid reservoirs and communicate through bore holes 149 to the annular space.

Figures 6A, 6B:
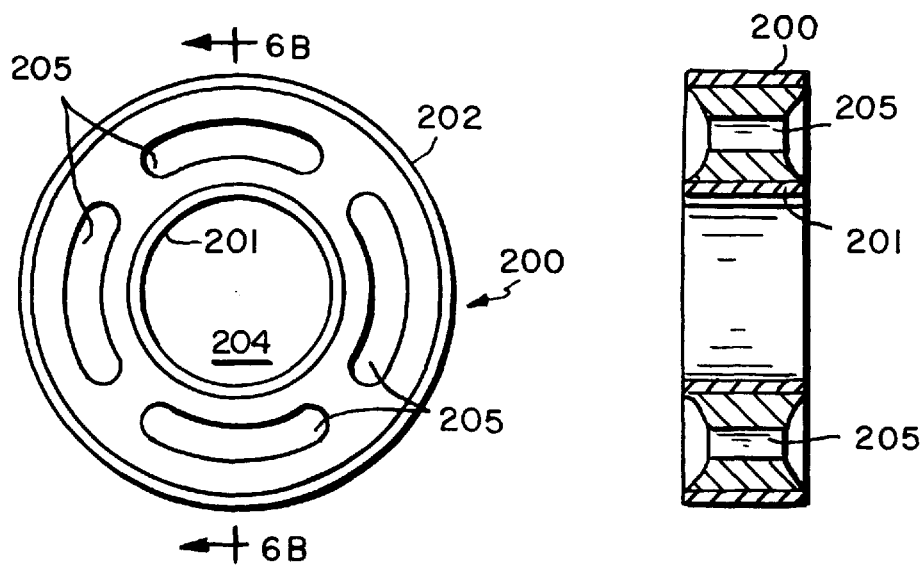
FIG. 6A is a plan view of an alternative damper for the flywheel module illustrated in FIG. 3.
FIG. 6B is a cross sectional side view of the alternative damper for the flywheel module illustrated in FIG. 6A.

As an alternative, an elastomeric damper 200 can also be used to dampen radial vibration at the end of the shaft (see FIGS. 6A–6B). The elastomeric damper 200 is an annular ring of elastomeric material preferably between two rings 201,202 made of a non magnetic, hard material as shown in FIGS. 6A–6B. The sleeve 135 is positioned in the center hole 204 and the damper is fixedly mounted within the plate member 131. Preferably, the damper has spaces formed within the ring to set the amount of damping, e.g., annular spaces 205.

Figure 7:
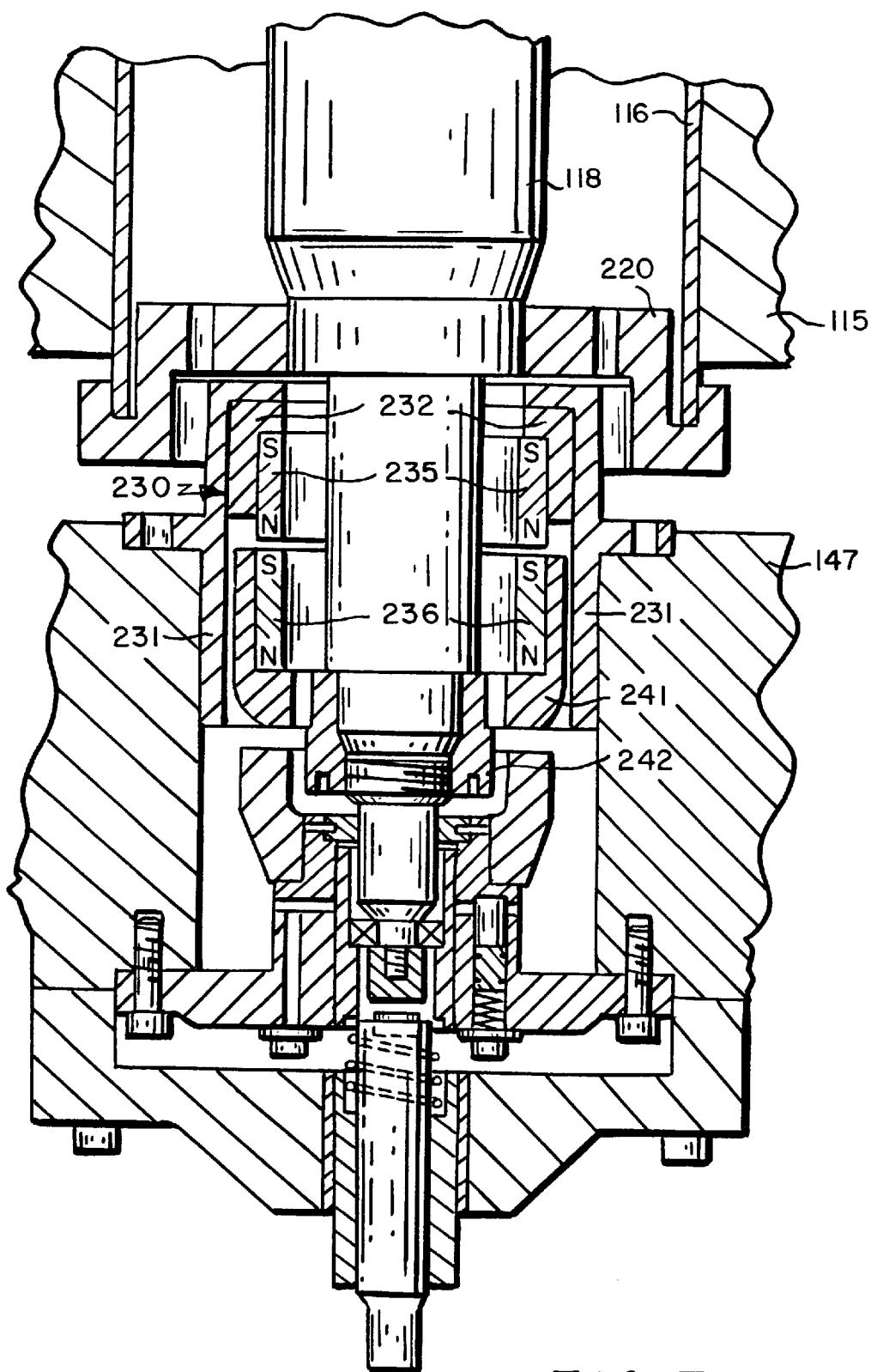
FIG. 7 is a cross sectional view in further detail of the bottom end radial magnetic bearing and damping system for the flywheel module illustrated in FIG. 3.

The bottom end of the shaft 118 also has a passive, combination axial/radial magnetic bearing, a touchdown bearing, and a damping system, similar to the top end. With reference to FIG. 7, the bottom of the flywheel 115 is held in place by cap 220 which is mounted on shaft 118 and engages tube 116. The lower passive axial bearing 230 is formed by a housing 231 that is mounted on the lower cover 147. Inside the housing is mounted an axially polarized permanent magnet 235 which is separated from the housing by a non-magnetic stainless steel spacer 232. Beneath the magnet 235 is positioned a second axially polarized magnet 236 which is fixedly mounted in a cap 241 which, in turn, is mounted on the shaft 118. Retainer nut 242 holds the cap 241 in place axially.

The damping system and touchdown bearing at the lower end are configured similarly to those at the top end as illustrated in FIG. 7. Many of the components are essentially duplicates of those used at the top end, as illustrated.

The flywheel energy storage rim is made preferably from a glass or carbon fiber composite with epoxy matrix, or the like. The rim for a 2 kW-hr flywheel power supply that can supply 1.0 kW of continuous power weighs approximately 100 lbs and is attached to the shaft using a lightweight hub structure. Such rim stores a total of 2,600 W-hr at its design speed of 30,000 RPM. Preferably, the rim material will permit the flywheel to operate at temperatures up to 85° C. without degradation in performance or cycle life.

The axial magnetic bearing is an active magnetic bearing which is off-loaded using the permanent magnets of the passive radial magnetic bearings for low loss operation. A polyimide annulus is employed, preferably, as a radial touchdown bearing for the radial magnetic bearing in the event of a shock or seismic occurrence which exceeds the capability of the magnetic bearings. The radial touchdown bearing is not for long-term operation. The touchdown bearing in the axial direction is provided via hardened surfaces preferably combined with a polyimide button.

Figure 2:
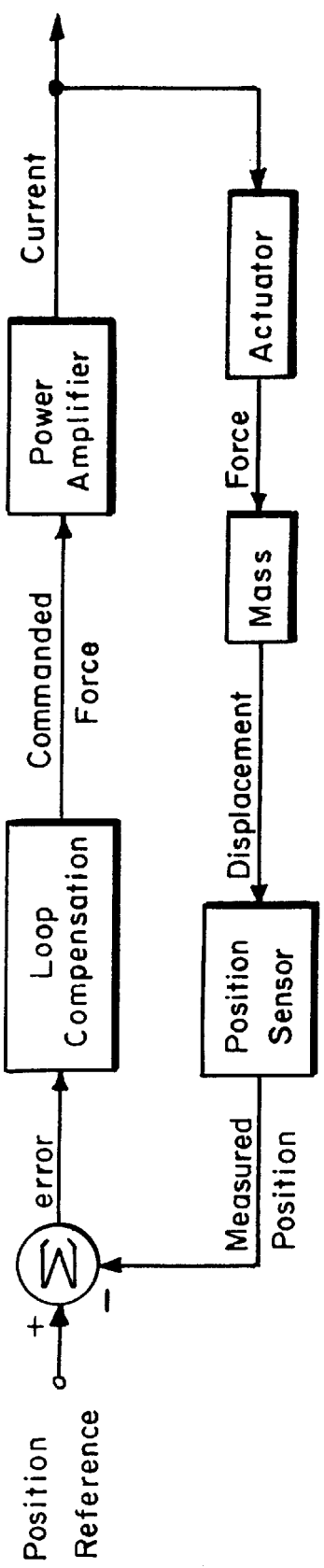
FIG. 2 is a block diagram illustrating the operation of an axial magnetic bearing in a flywheel device in accord with one embodiment of the present invention.

The general operation of the active magnetic axial bearing can be described as follows (see FIG. 2). The magnetic bearing is a position control loop which uses a magnetic actuator as the force generator. The applied force on the mass results in a displacement which is sensed using an axial position sensor. The sensed position, represented as a voltage, is compared to a reference position and the error is fed to the loop compensation which calculates the force to be commanded from the actuator and sends the signal to the power amplifier which produces the appropriate current in the actuator. The actuator then changes the applied force resulting in a closed loop system.

An integral 2-axis gimbal assembly is used preferably to maintain the vertical orientation of the spinning shaft despite variations in local ground inclination due to such affects as frost heaves and earthquake.

The motor/generator which performs the bi-directional electromechanical energy conversion is a preferably a permanent magnet ("PM") brushless design. Preferably, it uses neodymium boron iron magnets in a 4 or 6 pole configuration. Preferable, the configuration is structured to achieve greater than 96% efficiency when averaged over a complete charge/discharge cycle.

Figure 8:
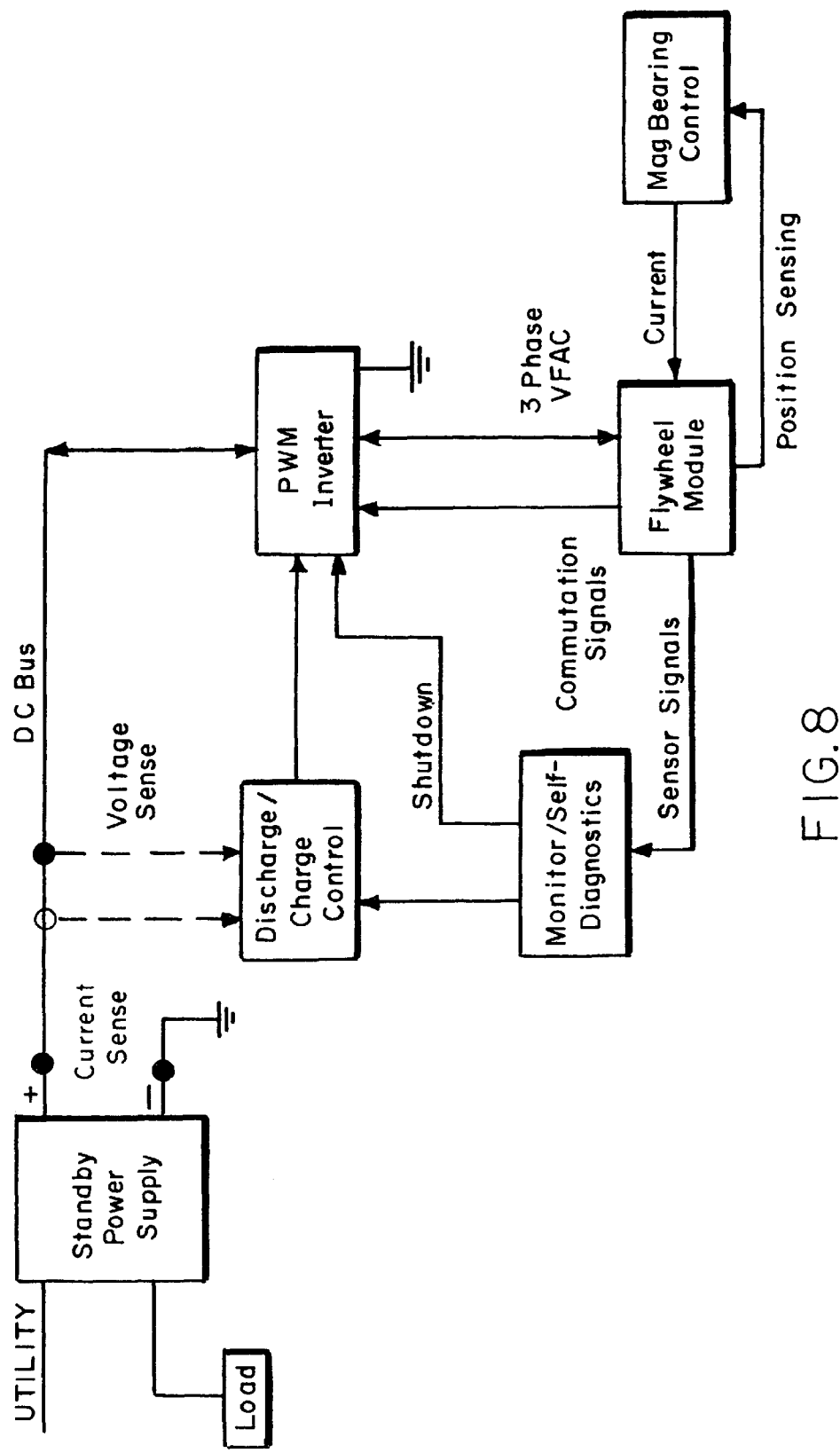
FIG. 8 is a block diagram illustrating a control system for a flywheel module of the present invention.

The control system is described with reference to FIG. 8. The DC bus of the flywheel module and control in accord with the present invention can be connected to the battery terminals of a conventional standby power control unit such as, for example, the Alpha Technology model XM 6015 power supply unit. The electronics for the flywheel is conveniently packaged as an electronics module. The heart of the electronics is the pulse width modulated ("PWM") inverter which performs bi-directional power conversion from the DC bus to the preferred three phase variable frequency AC required to excite the brushless motor/generator in the flywheel module. Because the PM brushless motor/generator is a synchronous machine, commutation sensors are required to determine the angular position of the rotor 85 relative to the stator. The unit can be driven with a device such as, for example, a Performance Controls inverter drive (part number BLM-1000). During charging of the flywheel, the PWM converter is under charge control which is implemented by regulating the DC bus voltage supplied from the UPS system to a constant voltage lower than the operating voltage of the UPS charger until such time as the flywheel reaches top speed. At this time the controller automatically switches to a speed control mode, holding the flywheel speed substantially constant at its designed speed, e.g., 30,000 RPM. This can be accomplished by steady trickle charging. Upon the loss of charging voltage, the system automatically switches to the discharge control mode during which the output voltage from the PWM inverter is held as a constant function of speed independent of the load presented. Demand for backup power from the flywheel can be detected in various ways, for example, by a drop in the bus voltage or by a change in the direction of current flow.

Figure 9:
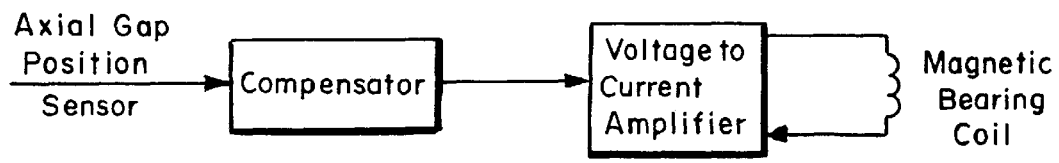
FIG. 9 is a block diagram illustrating the operation of the axial magnetic bearing.

A magnetic bearing control is illustrated in FIG. 9. A position sensor, which measures the axial gap between a component that is mounted on the shaft and a fixed component mounted on the flywheel housing in a convenient location, provides input to a compensator, preferable a proportional, integral and derivative compensator. The compensator provides a signal to a current amplifier, which supplies the current to the coil of the electromagnet of the active bearing.

Figure 10:
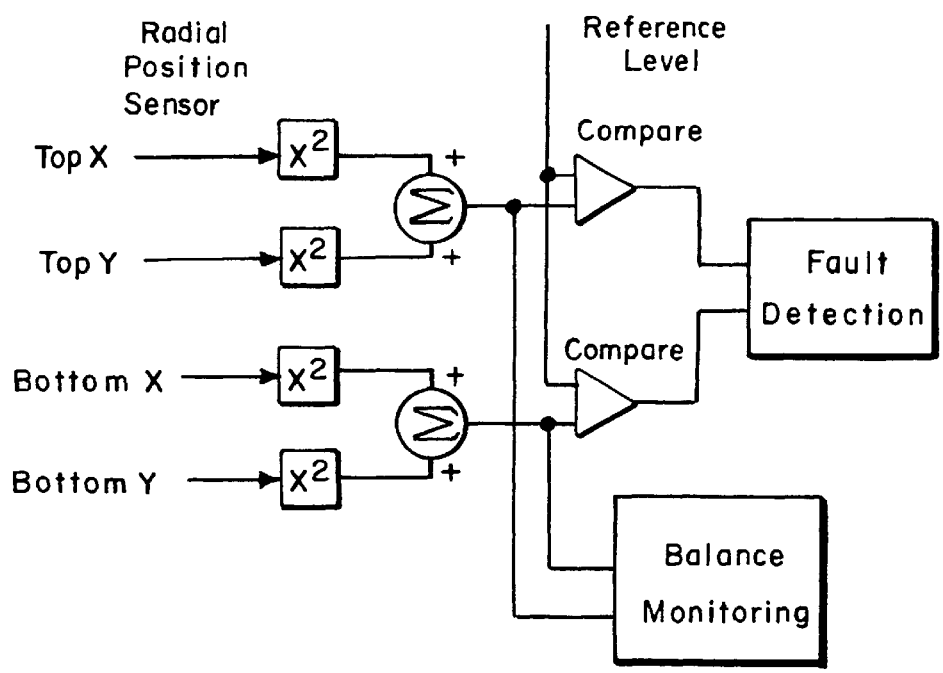
FIG. 10 is a block diagram illustrating a system for detecting the balance status of a flywheel module of the present invention.

A diagram for position sensing by the self-diagnosis component is illustrated in FIG. 10. A pair of radial position sensors are located at right angles (denoted, for example, x and y) to each other at both the top and bottom of the shaft. The x and y signals are combined and compared to reference signals to determine a state of imbalance in the flywheel. Signals are provided to monitor the balance and to a fault detection circuit for shutdown if the imbalance exceeds a predetermined level.

Figure 11:
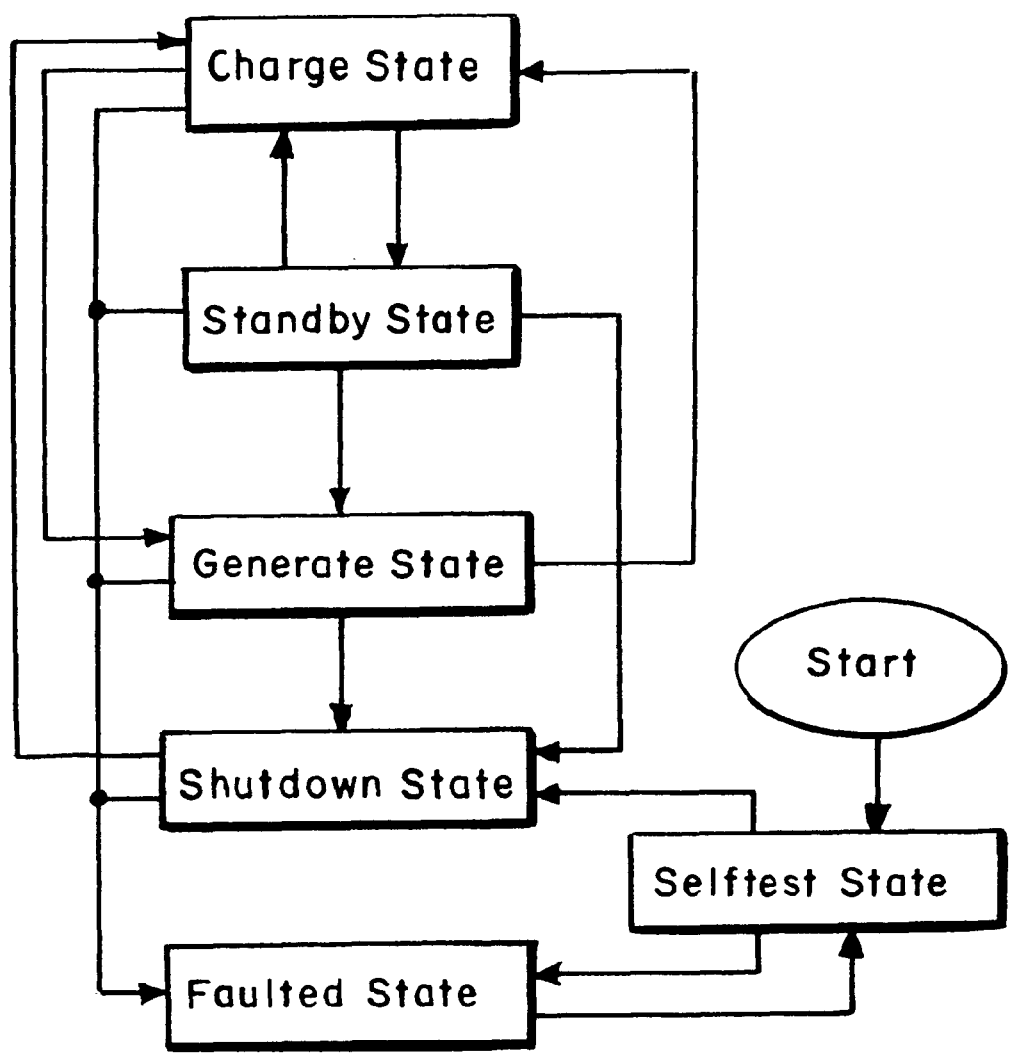
FIG. 11 is a state transition diagram for a controller for a flywheel module of the present invention.
Figure 12:
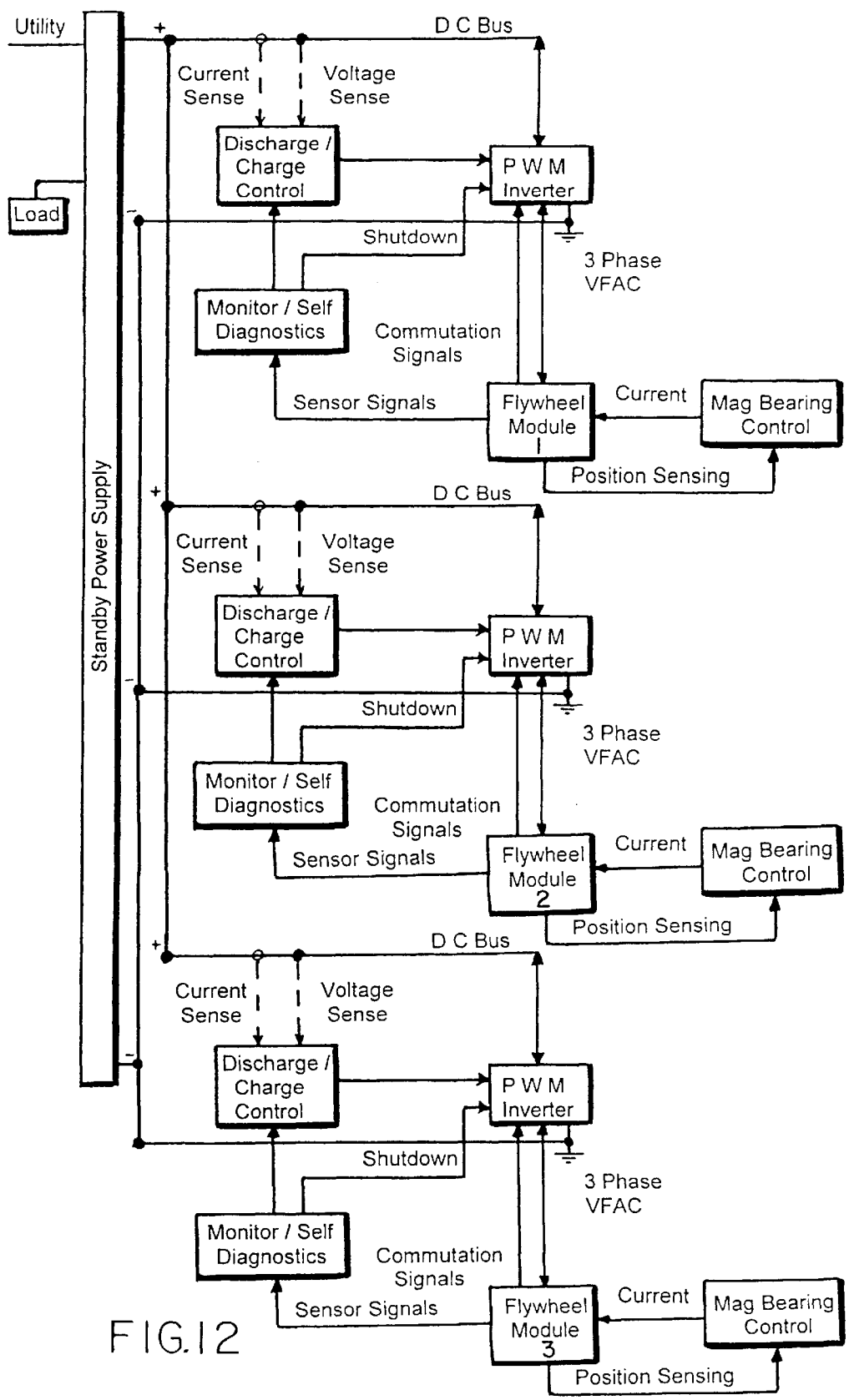
FIG. 12 is a block diagram illustrating a control system for a plurality of flywheels of the present invention.

A typical state transition diagram is illustrated in FIG. 11. When the system is turned on, a self test mode is initiated. If the self test passes, the system goes into a shutdown state. If the self test fails, the controller transitions to a faulted state. If, while in the faulted state, the system is enabled, it transitions back to the self test state. When in the shutdown state, two transitions are possible. If a fault is detected, a transition is made to the faulted state. If the system is enabled and UPS input power is on (i.e., trying to charge the flywheel), the system goes to the charge state. In the transition to the charge state, integrators are cleared and the gate drivers are turned on.

When in any state, if a fault is detected, the controller transitions to the faulted state and the gate drivers are turned off.

When in the charge state, if the flywheel speed is greater or equal to the maximum speed or if the system is disabled, a transition is made to standby state. When in standby state, the speed is maintained in its steady-state range. Once the system is in standby state, it will transition to shutdown state if the system is disabled. It will transition to the generate state, if input power is removed. Once the system is in the generate state, it will transition to shutdown state when flywheel speed is below a preset minimum or when the system is disabled.

The flywheel module of the present invention can be used in a configuration with a plurality of flywheel modules connected in parallel that will share the load. This configuration can be controlled to automatically share the load, preferably by using a control technique that does not require designating master and slave units.

During the discharge mode, the DC output current is preferably electronically limited to a safe overload value. The controller also preferably employs both DC overvoltage protection and flywheel overspeed protection as well as motor phase overcurrent protection, any of which will remove the gate drive signals from the inverter output transistors. This action enables the flywheel to coast to a stop. Preferably, a discharge resistor is used to stop the flywheel more quickly.

The controller is preferably configured as a separate unit or module so that it can be placed at a location different from the flywheel module.

In a typical in-ground installation, the flywheel module is connected to the system electronics which are installed, for example, in the pedestal along with the users equipment. The site typically is prepared by excavating a hole into which a precast, concrete sleeve is placed and backfilled. The support tube of the flywheel module slides inside the sleeve and connection is made to the electronics via an underground cable. A steel cover is then bolted and locked to the concrete sleeve. The containment preferably should be designed to ensure that failure of the flywheel or any other rotating components will be completely contained inside the concrete sleeve.

The controller preferably contains three commutation sensors which also function as redundant speed sensors, a synchronous motor which cannot produce predictive torque unless it is exactly excited at the frequency and phase angle of its rotation, and an overspeed shutdown method which together make an overspeed occurrence highly improbable. If the flywheel speed exceeds 105% of rated value, the gate drive signals preferably are removed from the inverter transistors instantaneously removing power to the flywheel. This action enables the flywheel to coast to a stop.

Preferably, information is obtained to at all times know the state of health of the FESS under all operating conditions. Delamination is by far the predominant wheel failure mechanism, and its onset is detectable through balance sensors, which can have the capability of detecting radial position to a high degree of resolution. Balance shifts which are outside the capability of the magnetic bearings to handle will result in a touchdown of the shaft onto the backup bearings. Backup bearings are designed to withstand several such events without failure and are designed to bring the flywheel to a stop in response to such an event.

The controller preferably will shutdown the unit if one of the following parameters exceeds predetermined limits: speed, balance, output voltage, output current or temperature. In addition, it is preferred that no single point failure will result in over-speed or over-voltage. Finally, failure of power circuitry components preferably should not result in subsequent failure of any control circuitry.

The controller also preferably has built-in self-test capability such that it will isolate the failed circuit to the board level and will indicate the failed board via an LED. The LED panel preferably will also indicate the following conditions locally and the system can be equipped with a standard communications interface enabling transmittal of information to remote monitoring sites:

1. DC input status (DC is within limits)
2. Output voltage status (voltage and current are within limit)
3. Inverter output frequency status (within operating values)
4. Flywheel speed (within operating values)
5. Output current-limit (power processing unit is in current-limit)
6. Available energy (greater than ½ full)
7. Windage loss (within operating values)
8. Flywheel module temperature (within operating limits)
9. Over-voltage and over-speed shutdown indication
10. Output disconnected
11. Flywheel balance (within operating limits).

In addition, the controller preferably can support remote monitoring of the value of any combination of the following parameters through the same port: Number of charge/discharge cycles with depth and duration; Standby power; State of balance; Bus voltage; Output current; Temperature; Speed; and Serial number.

The flywheel acts as an electromechanical battery to efficiently store and release energy. The motor/generator draws power from the electrical bus to charge (spin-up) the flywheel rotor to its operating speed. The flywheel spins in its steady-state speed range on frictionless magnetic bearings drawing a minimal load from the bus. When called upon to provide standby power, the flywheel electric machine transitions from a motor into a generator to draw the kineticly stored energy from the flywheel to deliver uninterruptible power. The flywheel module is installed in a specially designed in-ground vault to insure safe operation, and it is connected via an underground cable to the flywheel electronics module that is located inside the existing pole-mounted power supply or electronics cabinet. Because the flywheel is designed as a "plug for plug" battery replacement, the flywheel electronics module preferably interfaces directly to the battery terminals of the power supply.

The invention has been described in detail with reference to preferred embodiments thereof. However, it will be appreciated that, upon consideration of the present specification and drawings, those skilled in the art may make modifications and improvements within the spirit and scope of this invention as defined by the claims.

We claim:

1. A power supply device for providing uninterrupted power for a period of time,
   the power supply device comprising a controller and a flywheel device,
   the flywheel device comprising a housing containing a flywheel rotor and a motor/generator comprising a motor/generator rotor,
   the flywheel rotor and the motor/generator rotor being mounted on a common shaft,
   an active axial magnetic bearing comprising a coil surrounding the shaft and being located adjacent to the motor/generator rotor for frictionless rotation,
   the bearing providing support for the shaft, the flywheel rotor and motor/generator rotor,
   the axial magnetic bearing being attached to the housing and providing, in combination with the motor/generator rotor, a flux path and magnetic field tending to lift the motor/generator rotor and the shaft on which it is mounted,
   wherein a single flux path extends through the motor/generator rotor and axial magnetic bearing providing the magnetic field tending to lift the motor/generator rotor and the shaft on which it is mounted.

2. The power supply device of claim 1, wherein the housing contains a vacuum.

3. The power supply device of claim 1, wherein the motor/generator is located between the axial magnetic bearing and the flywheel rotor.

4. The power supply device of claim 1, wherein a passive radial magnetic bearing is located at one end of the shaft.

5. The power supply device of claim 4, wherein the passive radial magnetic bearing off-loads about 70% of the weight of the shaft and rotors mounted thereon.

6. The power supply device of claim 1, wherein a passive radial magnetic bearing is located at both ends of the shaft.

7. The power supply device of claim 6, wherein the passive radial magnetic bearings off-load about 70% of the weight of the shaft and rotors mounted thereon.

8. The power supply device of claim 1, wherein the passive radial magnetic bearing comprises an axially polarized permanent magnet.

9. The power supply device of claim 8, further comprising a radial touchdown bearing.

10. The power supply device of claim 9, wherein the radial touchdown bearing comprises a ring of a polyimide material.

11. The power supply device of claim 8, wherein the axially polarized permanent magnet provides additional axial support for the shaft and rotors mounted thereon.

12. The power supply device of claim 8, wherein the axially polarized permanent magnet provides axial support for about 70% or more of the weight of the shaft and rotors mounted thereon.

13. The power supply device of claim 1, wherein the flywheel rotor has a rim comprising glass or carbon fibers in an epoxy matrix.

14. The power supply device of claim 1, wherein the motor/generator is a permanent magnet brushless device.

15. The power supply device of claim 14, further comprising a rotating return flux path for the permanent magnet brushless device.

16. The power supply device of claim 14, wherein the motor/generator has a 4 pole configuration.

17. The power supply device of claim 14, wherein the motor/generator comprises neodymium boron iron magnets.

18. The power supply device of claim 1, wherein the motor/generator is located along the shaft between the axial magnetic bearing and the flywheel rotor and wherein a passive radial magnetic bearing is located at one end of the shaft.

19. The power supply device of claim 18, wherein the passive radial magnetic bearing off-loads about 70% of the weight of the shaft and rotors mounted thereon.

20. A flywheel device comprising:
    a housing containing a flywheel rotor and
    a motor/generator comprising a motor/generator rotor,
    the flywheel rotor and the motor/generator rotor being mounted on a common shaft,
    an active axial magnetic bearing comprising a coil surrounding the shaft and being located adjacent to the motor/generator rotor for frictionless rotation, the bearing providing support for the shaft, the flywheel rotor and motor/generator rotor,
    the axial magnetic bearing being connected to the housing and providing, in combination with the motor/generator rotor, a flux path and magnetic field tending to lift the motor/generator rotor and the shaft on which it is mounted,
    wherein a single flux path extends through the motor/generator rotor and axial magnetic bearing providing the magnetic field tending to lift the motor/generator rotor and the shaft on which it is mounted.

21. The flywheel device of claim 20, wherein the housing contains a vacuum.

22. The flywheel device of claim 20, wherein the motor/generator is located between the axial magnetic bearing and the flywheel rotor.

23. The flywheel device of claim 20, wherein a passive radial magnetic bearing is located at one end of the shaft.

24. The flywheel device of claim 23, wherein the passive radial magnetic bearing off-loads about 70% of the weight of the shaft and rotors mounted thereon.

25. The flywheel device of claim 20, wherein a passive radial magnetic bearing is located at both ends of the shaft.

26. The flywheel device of claim 25, wherein the passive radial magnetic bearing off-loads about 70% of the weight of the shaft and rotors mounted thereon.

27. The flywheel device of claim 20, wherein the passive radial magnetic bearing comprises an axially polarized permanent magnet.

28. The flywheel device of claim 27, further comprising a radial touchdown bearing.

29. The flywheel device of claim 28, wherein the radial touchdown bearing is a ring comprising a polyimide material.

30. The flywheel device of claim 27, wherein the axially polarized permanent magnet provides additional axial support for the shaft and rotors mounted thereon.

31. The flywheel device of claim 27, wherein the axially polarized permanent magnet provides axial support for about 70% or more of the weight of the shaft and rotors mounted thereon.

32. The flywheel device of claim 20, wherein the flywheel rotor has a rim comprising glass or carbon fibers in an epoxy matrix.

33. The flywheel device of claim 20, wherein the motor/generator is a permanent magnet brushless device.

34. The flywheel device of claim 33, further comprising a rotating return flux path for the permanent magnet brushless device.

35. The flywheel device of claim 33, wherein the motor/generator has a 4 pole configuration.

36. The flywheel device of claim 33, wherein the motor/generator comprises neodymium boron iron magnets.

37. A backup power supply comprising a flywheel device according to claim 20.

38. The backup power supply of claim 37, comprising a plurality of flywheel devices connected in parallel.

39. A power supply device for providing uninterrupted power for a period of time, the power supply device comprising a controller and a flywheel device, the flywheel device comprising: a housing containing a flywheel rotor and a motor/generator comprising a motor/generator rotor, the flywheel rotor and the motor/generator rotor being mounted on a common shaft, an active axial magnetic bearing being located to support the shaft for frictionless rotation, the bearing providing support for the shaft, the flywheel rotor and motor/generator rotor, the axial magnetic bearing being attached to the housing and providing, in combination with the motor/generator rotor, a flux path and magnetic field tending to lift the motor/generator rotor and the shaft on which it is mounted, wherein a single flux path extends through the motor/generator rotor and axial magnetic bearing providing the magnetic field tending to lift the motor/generator rotor and the shaft on which it is mounted, the flywheel device further comprising a damping device positioned at one end of the shaft, the damping device comprising a plate member having a center bore and a sleeve positioned in the center bore and fitting around the shaft, the plate member having a chamber for containing a fluid, the chamber communicating with the center bore by means of a bore hole for fluid passage therebetween, the chamber containing a spring and a plug, the plug being located between the spring and the fluid to transfer a force from the spring to the fluid or the fluid to the spring.

40. A flywheel device comprising: a housing containing a flywheel rotor and a motor/generator comprising a motor/generator rotor, the flywheel rotor and the motor/generator rotor being mounted on a common shaft, an active axial magnetic bearing being located to support the shaft for frictionless rotation, the bearing providing support for the shaft, the flywheel rotor and motor/generator rotor, the axial magnetic bearing being connected to the housing and providing, in combination with the motor/generator rotor, a flux path and magnetic field tending to lift the motor/generator rotor and the shaft on which it is mounted, wherein the motor/generator is located between the axial magnetic bearing and the flywheel rotor, wherein a single flux path extends through the motor/generator rotor and axial magnetic bearing providing the magnetic field tending to lift the motor/generator rotor and the shaft on which it is mounted, the flywheel device further comprising a damping device positioned at one end of the shaft, the damping device comprising a plate member having a center bore and a sleeve positioned in the center bore and fitting around the shaft, the plate member having a chamber for containing a fluid, the chamber communicating with the center bore by means of a bore hole for fluid passage therebetween, the chamber containing a spring and a plug, the plug being located between the spring and the fluid to transfer a force from the spring to the fluid or the fluid to the spring.

* * * * *